United States Patent [19]

Eisenberg

[11] 3,801,244

[45] Apr. 2, 1974

[54] APPARATUS FOR MAKING A FOAMED ARTICLE HAVING A PLASTIC SKIN BONDED THERETO

[76] Inventor: Harvey Eisenberg, 9 Demarest Rd., Livingston, N.J. 07039

[22] Filed: Feb. 8, 1972

[21] Appl. No.: 224,517

[52] U.S. Cl. ............ 425/10 Z, 264/135, 264/259, 425/112, 425/122, 425/437, 425/817
[51] Int. Cl. ............................................ B29d 27/04
[58] Field of Search ......... 264/45, 52, 53, 135, 259, 264/256, 251; 425/4, 112, 102, 122, 388, 126, 817, 437

[56] References Cited
UNITED STATES PATENTS

| | | | |
|---|---|---|---|
| 2,965,932 | 12/1960 | Knowles | 264/251 |
| 3,204,016 | 8/1965 | Sanger | 425/817 |
| 3,277,220 | 10/1966 | Plymale | 264/53 |
| 3,608,055 | 9/1971 | Long | 425/388 |

Primary Examiner—Robert D. Baldwin
Assistant Examiner—Mark Rosenbaum
Attorney, Agent, or Firm—Rudolph J. Jurick

[57] ABSTRACT

Apparatus and method for molding a non-planar article having a thermoplastic skin bonded to a foamed plastic body, said article being completely formed from conventional materials in a two-piece mold while the mold is closed.

6 Claims, 8 Drawing Figures

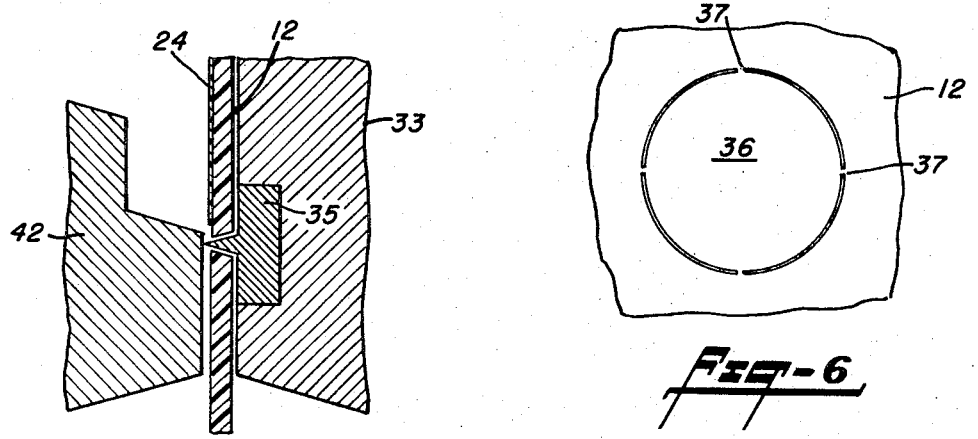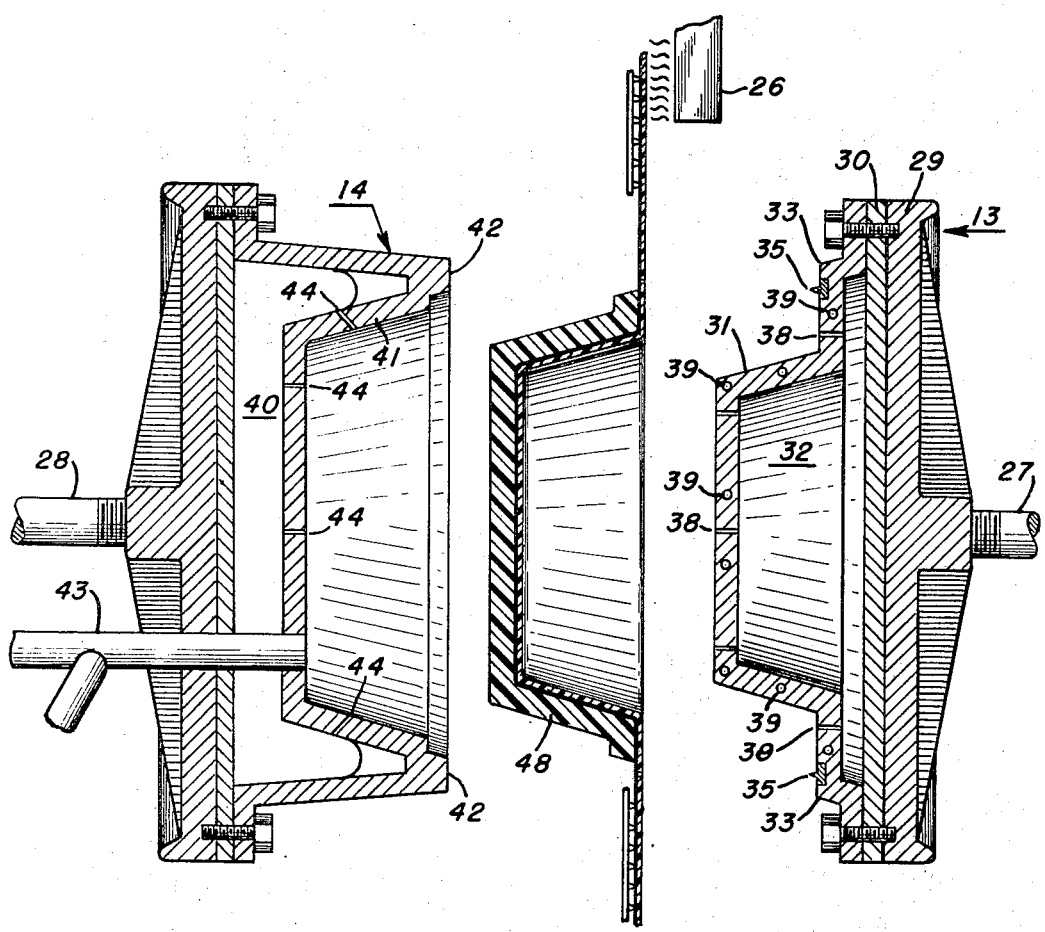

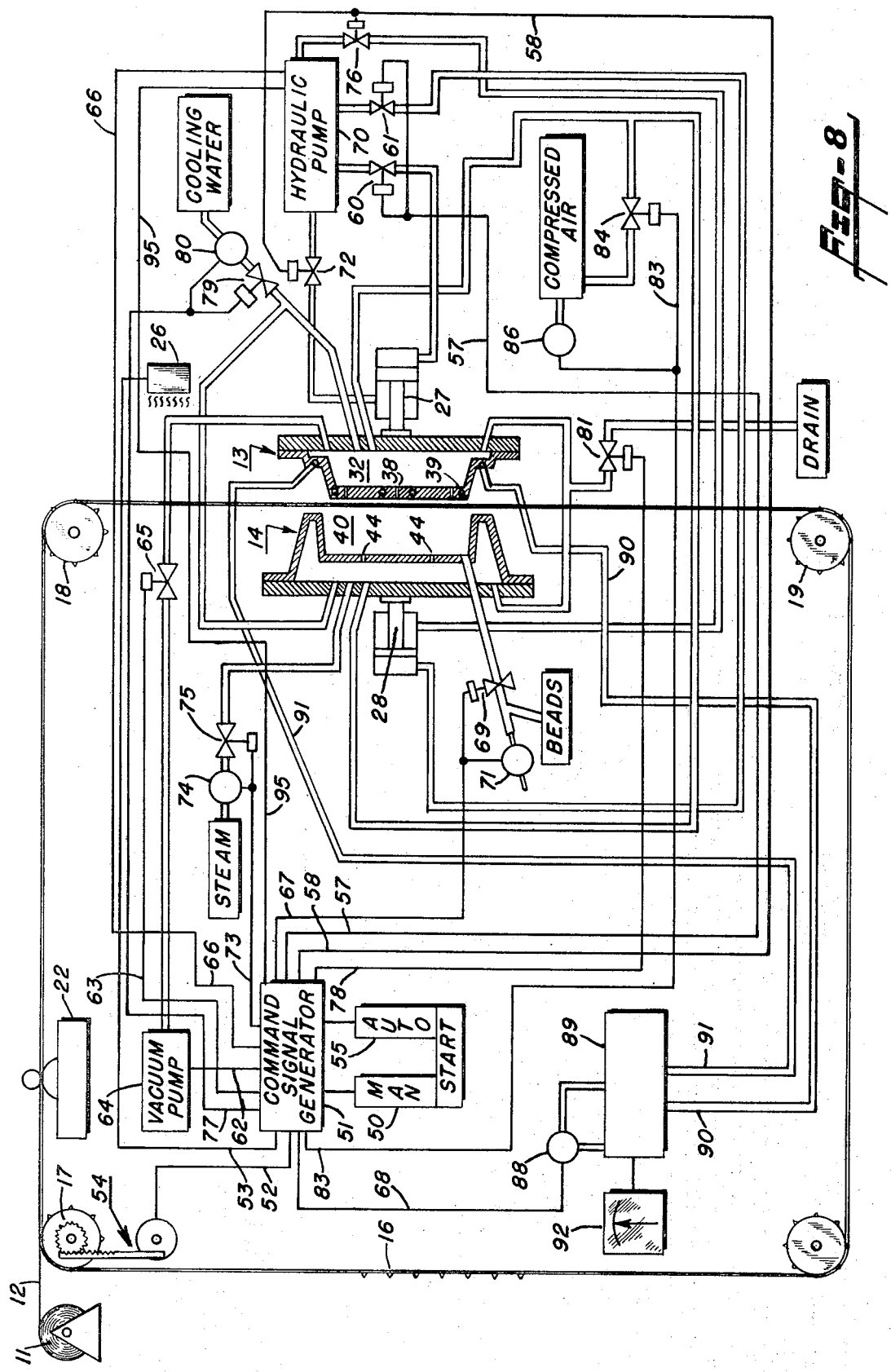

APPARATUS FOR MAKING A FOAMED ARTICLE HAVING A PLASTIC SKIN BONDED THERETO

BACKGROUND OF THE INVENTION

In the manufacture of various non-planar articles from foamed plastic it is desirable to bond a relatively thin, tough plastic skin to one side of the article. The foamed plastic provides the desirable advantages of rigidity, light weight and low cost as well as good thermal insulation and shock-absorbing properties. On the other hand, the plastic skin provides punture resistance, an easily cleaned surface and, if desired, decorative features. Also, the skin adds mechanical strength to the article as a whole by reason of the laminar structure. In some prior methods of manufacturing such articles, the skin is formed on a foamed plastic body by spraying or dipping operations. The skins so formed are relatively thin and weak structurally. In other prior arrangements the foamed plastic body and a thermoplastic shell are formed in separate molds, after which the shell is bonded to the body by a means of a suitable adhesive. It also has been proposed to make such articles in a turret or sequential indexing type molding machine having a plurality of molds which are advanced from one operating station to another. The formation of the foamed body and the thermoplastic shell as well as the necessary bonding and curing cycles are performed at different stations. A machine of this type is expensive because of the large number of mold cavities required and because of the complexity of the mold transporting mechanisms. Also, the various utility lines must be disconnected and then again connected to the molds as the molds are positioned in the various operating stations through a series of precise sequencing controls. Other prior methods have depended on thermal bonding of the two materials, which has not proven to be reliable in actual practice, thus leading to adhesive bonding. In the latter method, the adhesive is sprayed on the foamed body, or on the skin, which is wasteful of the adhesive lost to the air and adjacent areas and which is not economically recoverable.

In general, the prior molding arrangements require expensive machines and multiple molds which add substantially to the production cost of the article, thereby making them economically unattractive.

In accordance with this invention, an adhesive coating is applied to a thermoplastic sheet in a precise pattern. The steps of foaming the plastic body, the vacuum-forming of the plastic skin to the contour of the body, and the bonding together of the skin to the body, are performed automatically in a mold cavity formed between a pair of closed complementary molds clamped in a simple stationary molding machine, which cavity is not opened until the article is finished. Such arrangement minimizes the cost of the molding machine, eliminates manual operations and results in a relatively short processing cycle, all for the purpose of producing an article at low cost.

SUMMARY OF THE INVENTION

A pre-heated thermoplastic web, having a predetermined adhesive pattern applied to one side, is positioned between a pair of normally open, complementary molds, said web being clamped between flat lands of the molds when they are in the closed position. The web is then vacuum-formed to the contour of one of the molds, after which foamed plastic beads are injected into the mold cavity formed between the other mold and the adhesive-coated surface of the web. The beads are then fused together to form an integral body having the contoured portion of the web bonded thereto. After a cooling cycle, the molds are separated and the finished article is removed from the apparatus. The entire process of forming the article is automatic and carried out while the molds are closed.

An object of this invention is the provision of an improved apparatus for making a non-planar, foamed plastic article having a thermoplastic skin bonded to one side thereof.

An object of this invention is the provision of automatic apparatus for molding an article having a thermoplastic skin bonded to a foamed plastic body.

An object of this invention is the provision of automatic apparatus for molding a non-planar article comprising a plastic skin bonded to a foamed plastic body, the formation of the body and skin, and the bonding of the skin to the body, being carried out in the cavity of a closed mold.

An object of this invention is the provision of improved apparatus for making a non-planar article having a vacuum-formed plastic shell bonded to a foamed polystyrene body.

An object of this invention is the provision of automatic apparatus for making a non-planar article comprising a vacuum-formed plastic shell bonded to a foamed polystyrene body, in which apparatus a predetermined adhesive pattern is applied to a thermoplastic web passing between a pair of open molds, the vacuum-forming of the shell and the foaming of the polystyrene then being performed in sequence after the molds are closed.

The above-stated and other objects and advantages of the invention will become apparent from the following description when taken with the accompanying drawings. It will be understood, however, that the drawings are for purposes of illustration and are not to be construed as defining the scope or limits of the invention, reference being had for the latter purpose to the claim appended hereto.

BRIEF DESCRIPTION OF THE DRAWINGS

In the drawings wherein like reference characters denote like parts in the several views:

FIG. 5 is an enlarged, fragmentary sectional view showing the web-cutting anvil;

FIG. 6 is a fragmentary plan view drawn to a reduced scale and showing the plastic web as cut by the anvil;

FIG. 7 is similar to FIG. 4 but showing the finished article and the molds returned to the open position; and FIG. 8 is a schematic diagram of the piping and control system.

DESCRIPTION OF PREFERRED EMBODIMENT

Figure 1:
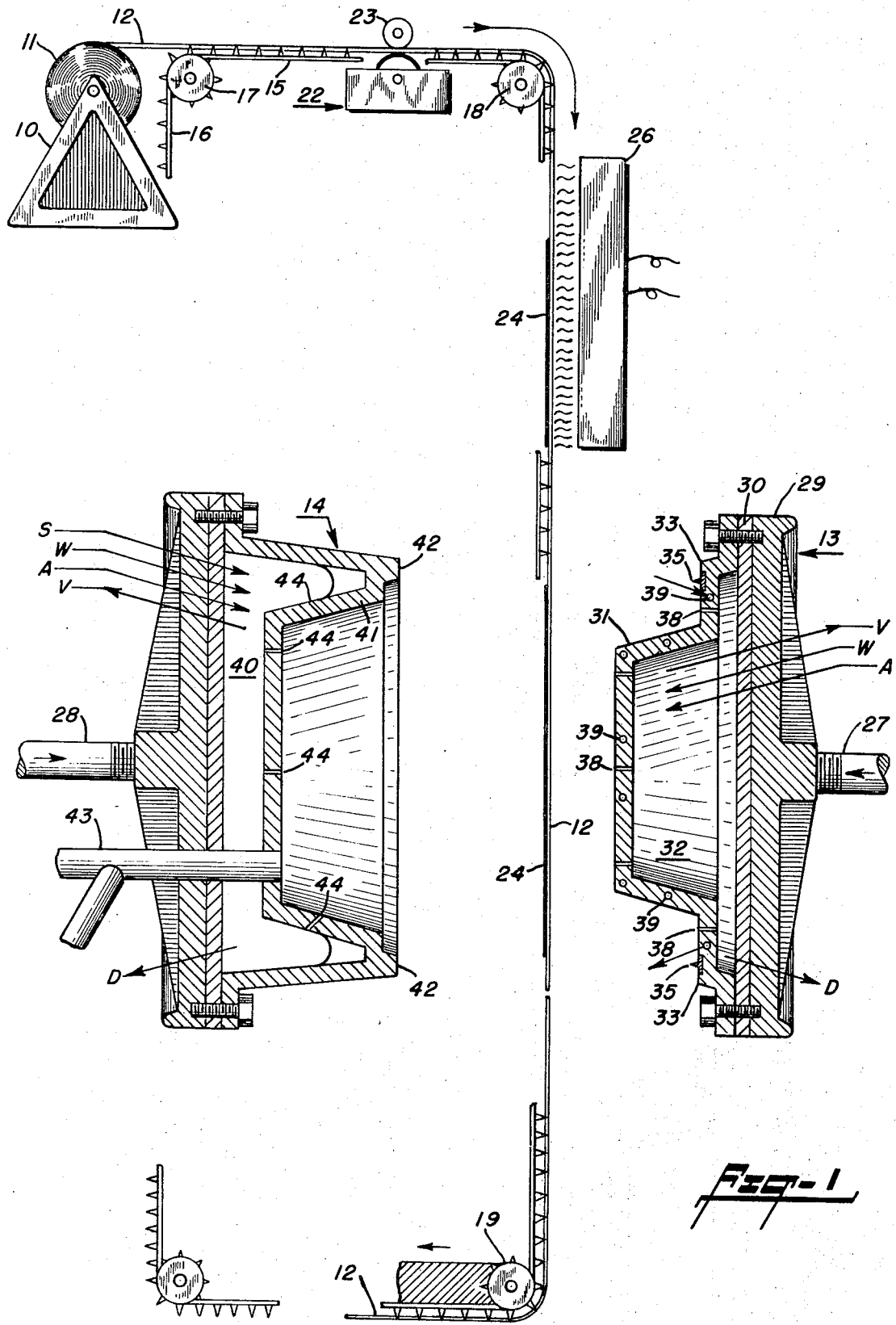
FIG. 1 is a diagrammatic representation of apparatus made in accordance with this invention, the two molds being shown in cross-section and in the normally-open position.

Referring now to FIG. 1, there is shown an unwind stand 10 carrying a roll 11 of a thermoplastic web 12, which web is used to make the skin or liner of the article. The web is transported between the normally open, complementary molds 13 and 14 by a web-feeding mechanism comprising a pair of endless, parallel, link-chains provided with upstanding pins, one such chain and pins being visible in this particular view and identified by the numerals 15 and 16 respectively. The link-chains pass around the sprocket pulleys 17, 18 and 19, as well as additional pulleys which are not shown in the drawings but which serve to close the chain loop without interfering with the operation of the molds and other operating parts of the apparatus. The two link-chains are spaced apart by a distance less than the width of the web 12 and the pins of the chains puncture through the web along the marginal edges thereof. The chains are driven by a conventional indexing mechanism, not shown, whereby a predetermined length of the web is advanced toward the molds for each operating cycle of the apparatus.

Figure 2:
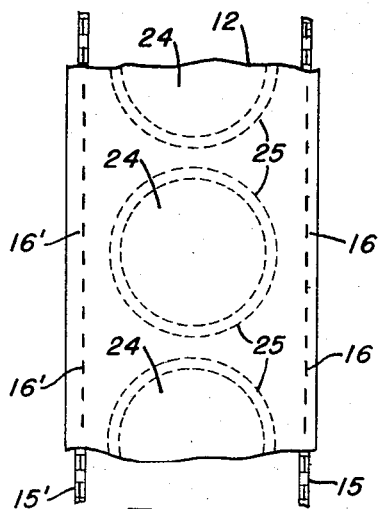
FIG. 2 is a fragmentary top plan view drawn to a reduced scale and showing the spaced, adhesive patterns applied to the thermoplastic web.

As the web 12 is advanced toward the molds, it passes through a conventional, single-side, flexographic type adhesive applicator 22 having a top pressure roll 23. This applicator applies spaced patterns of a suitable adhesive to the underside of the web as shown in the top plan view of FIG. 2. It is here pointed out that the article to be made, by way of example, is a circular basin made of foamed polystyrene and having a plastic skin bonded to the top side thereof. The adhesive pattern is a series of spaced circles 24, FIG. 2, each circle being concentric with but of smaller diameter than the circle 25 representing the periphery of the finished basin, for purposes which will be described below. In FIG. 2, the web is shown impaled on the pins 16, 16' of the link-chains 15, 15'.

Referring back to FIG. 1, the web 12 also passes by or through a conventional radiant heater 26, thereby to soften the web and to dry the liquid carrier of the pressure-sensitive, or heat-activated adhesive. The molds 13 and 14 are carried by the platens of a horizontal double-ended molding machine and are arranged for movement toward and away from each other by the hydraulically-actuated pistons 27 and 28, respectively. Referring specifically to the male mold 13, this mold is mounted on a platen 29 threaded onto the piston 27, with a mold-cavity back plate 30 and a male face plate 31, said face plate forming a mold chamber 32 and having a flat, circular land 33. Implanted into the land is a circular cutting knife 35 made of hardened steel and projecting forwardly a distance slightly greater than the thickness of the formed web to be cut, see also the enlarged fragmentary sectional view, FIG. 5. The knife is notched at several points. For example, and referring to the plan view of FIG. 6, the edge of the cutting knife may be notched at four points so that, when the knife cuts through the web 12 the cut, circular blank 36 remains attached to the web by the four uncut portions 37. Thus, the finished article will be removed from the mold area upon a subsequent movement of the web, as will be described more fully hereinbelow. Water and air are directed into and out of the mold chamber 32, FIG. 1, by means of conventional, flexible hoses attached to the mold, such utility lines being shown schematically by the arrows labeled W and A. Also, a conventional vacuum line and a drain line communicate with the mold chamber, as indicated by the arrows V and D, respectively. The mold face plate is provided with a plurality of small diameter vacuum holes 38 for drawing the web into contact with the face plate during the vacuum-forming operation. Also, interconnected channels 39 are provided in the face plate, which channels serve as passageways for the circulation of a temperature controlled fluid for precise temperature monitoring of the mold and the vacuum-formed web, using a conventional auxilliary mold temperature controller.

The female mold 14 is of generally similar construction having a mold cavity 40 communicating with steam, water, air, vacuum and drain lines, as indicated schematically by the arrows S, W, A, V and D. The female mold face plate 41 is aligned with and complementary to that of the mold face plate of the mold 13 and includes a land 42. A conventional, automatic, filler gun has a nozzle 43 for injecting pre-foamed polystyrene beads into the mold cavity formed when the molds are closed to the stand-off or filling position. The mold face 41 also includes openings 44 for purposes to be described herein-below.

Figure 3:
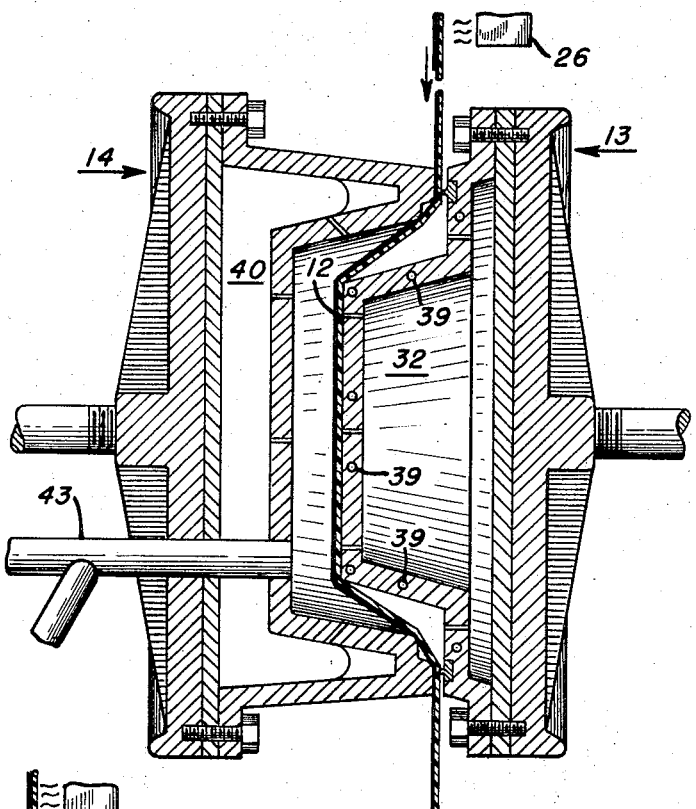
FIG. 3 is a fragmentary sectional view, similar to FIG. 1 but showing the molds advanced toward the web.
Figure 4:
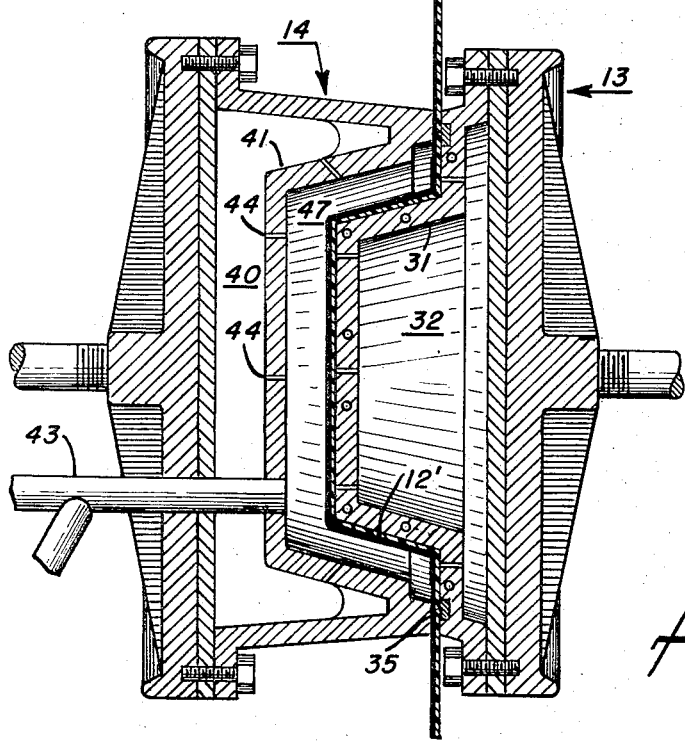
FIG. 4 is similar to FIG. 3 but showing the molds in mold-filling position and the shape of the plastic web after the vacuum-forming process.

At the proper time in the operating cycle, specifically, when the pre-heated web 12 has been advanced to position a circular pattern of the adhesive coating centrally between the molds, the molds are moved toward each other to the mold-filling position. During such movement of the molds, the pre-heated web is physically flexed and stretched somewhat, as shown in FIG. 3, wherein the molds are shown in the not quite fully closed position. As the molds move to the mold-filling position, as shown in FIG. 4, the mold chamber 32 is evacuated, whereby the interior web portion 12' is vacuum-formed to the contour of the mold face plate 31. The face plate 31 in contact with the vacuum-formed web portion 12' is controlled at a suitable temperature level to 'set' such web portion into its final configuration, yet maintaining the web portion at a temperature sufficient to promote thermal adhesive bonding of the foam beads thereto. Next, pre-foamed polystyrene beads are injected into the mold cavity through the nozzle 43. After the mold cavity is filled with beads, steam is passed through the mold chamber 40 through the connecting line S. The heating of the mold combined with the steam entering into the mold cavity through the holes 44 causes the polystyrene beads to coalese and fuse together into an integral mass, which mass is bonded to the formed web portion 12' by the expansion pressure of the coalescing beads against the adhesive. Thereafter, cooling water is caused to flow through the two mold chambers, thereby cooling the molds to firm up the foamed part into a solid body. Next, the molds are moved toward each other a small, discrete distance sufficient to cause the circular cutting knife 35 to cut through the web. The molds are now separated, (as shown in FIG. 7), by reverse movement of the pistons 27 and 28, and air under pressure is applied to the mold chambers, thus stripping the formed web and foamed body from the surfaces of both of the mold face plates and leaving the overall web and the finished composite basin suspended on the link-chains between the open molds. The next cycle of operation then follows, that is, the indexing mechanism moves the web forward to position the next circular pattern of adhesive between the open molds, while the completed basin, which is still attached to the web, is moved out of the mold region. The finished basin, still held in the web, eventually is moved into alignment with a web-stripping station, or a conventional blanking machine, not shown, where hardened steel dies cut the individual basin from the web for stacking or other post-operation such as decorative marking or lip-rolling. The excess web material is stripped from the link-chains and can be fed into a grinding machine for size reduction prior to re-extrusion as usable starting web stock. Since the pre-foamed beads are injected into a confined mold cavity and there is a precise pattern of the adhesive applied to the web, there is no excess or waste of the foam or adhesive materials adhering to the left-over web to be ground for re-use, thereby eliminating the problem of mixed scrap and effecting a most efficient reclamation of the web material.

Reference now is made to the schematic piping and control diagram of FIG. 8. To set-up the apparatus for automatic operation, the operator closes the manual start switch 50, whereby the command signal generator 51 applies a voltage to the leads 52 which results in the actuation of a conventional ratchet-driven linear repeatable indexing mechanism, here generally designated by the numeral 54. Simultaneously, a voltage is applied to the leads 53 and 66 resulting in the energization of the radiant heater 26 and the hydraulic pump 70, respectively. The ratchet mechanism drives the sprocket pulley 17, whereby the like-chain 16 advances the web 12 a pre-determined distance through the flexographic applicator 22 which applies the circular adhesive pattern to the web. When the adhesive-carrying portion of the web approaches the normally open molds 13 and 14, the operator can jog the start switch to position such coated web portion centrally of the molds, after which the automatic start switch 55 is closed, thereby placing the apparatus into automatic operation. The switch 55 remains closed until reset by the operator. The command signal generator now controls operation of the apparatus in the following sequence, with all of the control valves being normally closed with the exception of the drain valve 81. Also, the hydraulic line valves 72 and 76 are normally open to keep the molds in the illustrated open position.

1- The command signal generator maintains a voltage on the leads 53 and 68, thereby resulting in the energization of the heater 26 and the pump 88. In the diagrammatic illustration of FIG. 8, the heater 26 is positioned at a location removed from the web 12 but it will be understood that in the actual apparatus the heater is positioned proximate to the web and close to the molds. The pump 88 circulates heated fluid from the tank 89 through the supply line 91, the interconnected channels in the mold face plate of the mold 13 and the return line 90. The temperature controller 92 maintains the circulating fluid at a predetermined temperature, which temperature is below the softening point of the particular web material, thereby to set-up the vacuum-formed web when it comes into contact with the mold face plate. At the same time, the fluid temperature is high enough to promote adhesion of the foam beads with the adhesive coating on the web.

Simultaneously with the application of the voltage on the leads 53 and 68, the command signal generator applies a voltage to the lead 57 and 58. The voltage on the lead 58 closes the normally open solenoid valves 72 and 76, while the voltage on the lead 57 opens the solenoid valves 60 and 61 so that the pistons 27 and 28 drive the molds toward each other to the mold-filling position. As is conventional in this art, when the molds are in the mold-filling position, the lands on the molds are spaced a finite gap apart, of the order of 15–60 thousandths of an inch. This gap is sufficient to permit the venting of air and steam from the mold cavity, but not large enough to permit the escape of foam beads or particles from the physical confines of the mold cavity.

2- After the molds are in the mold-filling position, a voltage is applied to the leads 62 and 63, thereby actuating the vacuum pump 64 and opening the solenoid valve 65 to vacuum-form the pre-heated web to the contour of the mold face of the mold 13.

3- After the vacuum-forming step has been completed, the voltage is removed from the lead 63 and applied to the lead 67 which opens the solenoid-actuated nozzle valve 69 and energizes the air pump 71 to inject pre-foamed beads into the mold cavity. Entrapped cavity air and excess bead-transporting air is displaced by the incoming beads and vents through the small, finite gap at the mold lands. It is here pointed out that the head-injecting arrangement is shown schematically, but those skilled in this art will understand that a conventional bead-injecting system includes an internal piston having an end surface which normally lies flush with the interior wall of the mold cavity. During the cavity-filling operation the piston is retracted to permit the flow of beads into the cavity. At the completion of the cavity-filling operation, the piston is driven forwardly to clear the nozzle of beads. Thus, the foamed body will have a smooth, mono-planar surface formed only by the walls defining the mold cavity and the front end of the piston.

4- After a predetermined time period, sufficient to assure a complete filling of the mold cavity, the voltage is removed from the lead 67, thereby resulting in the de-energization of the pump 71 and the closing of the nozzle valve 69.

5- Voltage now is applied to the lead 73 which opens the steam line valve 75, whereby high pressure, dry steam is circulated through the mold chamber 40. After a predetermined time period, sufficient to drive out any condensed moisture from the mold chamber into the drain, a voltage is applied to the lead 78. This closes the normally open solenoid valve 81 causing the steam pressure to build up to a point sufficient to raise the mold face plate temperature and to force jets of live steam through the steam holes 44 provided in the mold face plate of the mold 14. The steam mixes with the pre-foamed beads in the mold cavity, thereby melting and fusing the beads to one another to form the foam body of the basin against and adhered to the adhesive-coated, vacuum formed web.

6- After a pre-determined time period, the voltages are removed from the leads 73 and 78, thereby closing the steam valve 75 and opening the drain valve 81 to release the built-up pressure of steam in the mold chamber 40. After a predetermined dwell period to prevent thermal shock to the foamed body, a voltage is applied to the lead 77 which opens the solenoid valve 79 and energizes the water pump 80. Cooling water now flows through both of the mold chambers and down the drain. The voltage is removed from the lead 77 after the molds have been allowed to cool for a certain time period, thereby terminating the cooling cycle.

7- The molding cycle now having been completed, a voltage is applied to the lead 95 which energizes an extra-high-pressure hydraulic circuit in the hydraulic pump to force the molds 13 and 14 to a fully closed position. This movement of the molds causes the circular cutting knife to pierce through the web material.

8- Next, a voltage is applied momentarily to the leads 78 and 83. The voltage on the lead 78 closes the drain valve 81, while the voltage on the lead 83 opens the air valve 84 and starts the air pump 86. Compressed air now is blown into both of the mold cavities to assist in releasing the formed web and the foamed body from their respective mold face plates.

9- Simultaneously, the voltage on the lead 57 is removed, thereby closing the hydraulic valves 60 and 61, and a voltage is applied to the lead 58 to open the hydraulic valves 72 and 76, thereby driving the pistons in a reverse direction and returning the molds to their normally open position.

10- When the molds are in the fully open position, a voltage again is applied to the lead 52 to actuate the indexing mechanism 54 for a single cycle of operation, thereby advancing the web a distance equal to the longitudinal spacing between the circular adhesive coatings applied to the web by the applicator 22. This linear movement of the web positions the next coated portion of the web centrally between the molds and, at the same time, transports the completed basin from the mold region. The automatic control cycle is then repeated.

The described apparatus constitutes a continuous, repeatable and economic arrangement for making non-planar, foamed products having a thermoplastic skin bonded to one side thereof. The thermoplastic skin can be bonded to the other side of the article by reversing the positions of the mold face plates, providing a suitable entry port for the bead-injecting nozzle, and providing temperature control channels on the mold face plate against which the web is vacuum formed.

Although the method and apparatus have been described with specific reference to the formation of the basin body by using pre-foamed polystyrene beads, it will be apparent that the beads need not be pre-foamed and that other foamable plastic such as polyurethane foam may be used in the practice of the invention. Also, the skin material may be made from a variety of vacuum-formable plastics such as high-density extruded foam styrene, high- or medium-impact styrene, acrylonitrile-butadiene-styrene (A.B.S.)-type plastic, oriented styrene, acetate, vinyls, polypropylene, polyethylene, etc., as well as cellulose-based materials such as extensible or creped paper, and the newer resin-bonded, non-woven thermoformable fabrics. Additionally, it will be obvious to those skilled in this art that the material which forms the skin may either be supplied to the molding machine in the form of the described continuous web or in the form of individual sheets fed to endless link-chains having upstanding pins or other gripping devices.

Having now described the invention what I desire to protect be letters patent is set forth in the following claims.

I claim

1. Apparatus for molding an article having a thermoplastic skin bonded thereto, said apparatus comprising, a- first and second normally-open molds having complementary mold face plates forming a mold cavity when the molds are in the closed position,
   b- means for applying an adhesive coating of predetermined pattern to a surface of a relatively thin, vacuum-formable material,
   c- means for heating said material with said coating,
   d- means automatically positioning the said material with said coating centrally disposed between the molds and away from the mold face plate of the first mold,
   e- means for closing and opening the molds,
   f- means for vacuum-forming the said material to the contour of the mold face plate of said first mold,
   g- means for filling the mold cavity with a foamable plastic material,
   h- means for fusing the foamable material into an integral body bonded to the contoured portion of said material,
   i- means for cooling the molds and,
   j- means for stripping the finished article from the molds.

2. Automatic molding apparatus comprising,
   a- first and second normally open molds having complementary mold face plates forming a mold cavity when the molds are in the closed position,
   b- means for extending a web of vacuum-formable material between the molds,
   c- means for applying spaced adhesive coatings to one surface of the web, said coatings having a predetermined pattern,
   d- means for pre-heating the web with said coatings,
   e- means for positioning the web with one of the coatings centrally disposed between the molds and away from the mold face plate of the first mold,
   f- means for moving both of the molds toward each other and away from each other,
   g- means for vacuum-forming the said web portion to the contour of the mold face plate of the first mold,
   h- means for filling the mold cavity with foamable plastic material,
   i- means for fusing the foamable material into an integral body bonded to the formed portion of the web,
   j- means for cooling the molds, and 3. The invention as recited in claim 2, including means for applying air under pressure to the opposed surfaces of the completed article as the molds are moved away from each other.

4. The invention as recited in claim 2, wherein said means for fusing includes means for maintaining the mold face plate of the first mold at a predetermining temperature, which temperature is below the softening point of the web.

5. The invention as recited in claim 2, wherein the molds include facing lands; and including a cutting knife secured to one of the mold lands, which cutting knife has a configuration similar to but larger than the adhesive coating on the web, said cutting knife having a discontinous cutting edge extending from the mold land a distance greater than the thickness of vacuum-formed web portion; and means causing the cutting knife to cut through the said web portion as the molds are moved toward each other.

6. The invention as recited in claim 2, wherein the said web is supported by a pair of spaced, endless chains having pins projecting through the web at points proximate to the side edges thereof.

* * * * *

UNITED STATES PATENT OFFICE
CERTIFICATE OF CORRECTION

Patent No. 3801244      Dated April 2, 1974

Inventor(s) Harvey Eisenberg

It is certified that error appears in the above-identified patent and that said Letters Patent are hereby corrected as shown below:

Column 8, line 27; - delete "extending" and substitute -- supporting --
  line 28; - delete "between the molds"
  lines 36, 37; - delete "moving both of the molds toward each other and away from each other" and substitute -- closing and opening the molds --
  line 43; - after "web," insert -- and --
  line 44; - delete ", and"
  lines 49, 50; - delete "wherein said means for fusing includes" and substitute -- including --

Signed and sealed this 10th day of September 1974.

(SEAL)
Attest:

McCOY M. GIBSON, JR.
Attesting Officer

C. MARSHALL DANN
Commissioner of Patents